(12) United States Patent
Van Esbroeck et al.

(10) Patent No.: US 11,981,078 B2
(45) Date of Patent: May 14, 2024

(54) METHOD AND DEVICE FOR DECENTRALIZED AUTOMATED ADDITIVE MANUFACTURING

(71) Applicant: Structo Pte. Ltd., Singapore (SG)

(72) Inventors: Hubertus Theodorus Petrus Van Esbroeck, Toronto (CA); Boyle Suwono, Singapore (SG); Harsh Gupta, Treescape (SG)

(73) Assignee: Structo Pte. Ltd., Singapore (SG)

( * ) Notice: Subject to any disclaimer, the term of this patent is extended or adjusted under 35 U.S.C. 154(b) by 0 days.

(21) Appl. No.: 18/313,512

(22) Filed: May 8, 2023

(65) Prior Publication Data
US 2023/0311414 A1     Oct. 5, 2023

Related U.S. Application Data

(63) Continuation of application No. 16/619,969, filed as application No. PCT/SG2018/050290 on Jun. 11, 2018, now Pat. No. 11,660,814.

(30) Foreign Application Priority Data

Jun. 9, 2017   (SG) .......................... 10201704776W
Feb. 12, 2018  (SG) ........................... 10201801184R (51) Int. Cl.
*B29C 64/232*     (2017.01)
*A61C 13/00*      (2006.01)
(Continued)

(52) U.S. Cl.
CPC ........ *B29C 64/232* (2017.08); *A61C 13/0004* (2013.01); *A61C 13/0019* (2013.01);
(Continued)

(58) Field of Classification Search
CPC ... B29C 64/124; B29C 64/129; B29C 64/135; B29C 64/35; B29C 64/171; B29C 64/176; B29C 64/182
See application file for complete search history.

(56) References Cited

U.S. PATENT DOCUMENTS

| | | | |
|---|---|---|---|
| 5,248,456 A * | 9/1993 | Evans, Jr. .............. | B33Y 40/20 118/712 |
| 7,556,490 B2 * | 7/2009 | Wicker .................. | B33Y 40/00 425/375 |

(Continued)

FOREIGN PATENT DOCUMENTS

| | | | | |
|---|---|---|---|---|
| EP | 3632655 A1 * | 4/2020 | .......... | B29C 64/129 |
| JP | 05318606 A  * | 12/1993 | | |
| JP | 07060843 A  * | 3/1995 | .......... | B29C 64/124 |

*Primary Examiner* — Atul P. Khare
(74) *Attorney, Agent, or Firm* — Optimus Patents US, LLC (57) ABSTRACT

A device comprising; a controller arranged to receive data for an article to print; a sub-device comprising a resin source arranged to provide material for printing the article; a radiation source arranged to direct radiation for the printing of said article; a plurality of stations, said stations including a printing tank in which the article is printed, at least one cleaning station for cleaning the printed article and a curing station arranged to at least partially complete the curing of the printed article; a build surface upon which the article is arranged to be printed; wherein controller is arranged to move the build surface and the plurality of stations relative to each other.

17 Claims, 10 Drawing Sheets

(51) Int. Cl.
*B29C 64/129* (2017.01)
*B29C 64/236* (2017.01)
*B29C 64/241* (2017.01)
*B29C 64/245* (2017.01)
*B29C 64/255* (2017.01)
*B29C 64/259* (2017.01)
*B29C 64/264* (2017.01)
*B29C 64/277* (2017.01)
*B29C 64/35* (2017.01)
*B29C 64/379* (2017.01)
*B29C 64/386* (2017.01)
*B29C 64/393* (2017.01)
*A61C 9/00* (2006.01)
*B29C 64/124* (2017.01)
*B29C 71/00* (2006.01)
*B29L 31/00* (2006.01)
*B33Y 10/00* (2015.01)
*B33Y 30/00* (2015.01)
*B33Y 40/20* (2020.01)
*B33Y 50/02* (2015.01)

(52) U.S. Cl.
CPC .......... *B29C 64/129* (2017.08); *B29C 64/236* (2017.08); *B29C 64/241* (2017.08); *B29C 64/245* (2017.08); *B29C 64/255* (2017.08); *B29C 64/259* (2017.08); *B29C 64/264* (2017.08); *B29C 64/277* (2017.08); *B29C 64/35* (2017.08); *B29C 64/379* (2017.08); *B29C 64/386* (2017.08); *B29C 64/393* (2017.08); *A61C 9/0053* (2013.01); *B29C 2071/0027* (2013.01); *B29L 2031/7536* (2013.01); *B33Y 10/00* (2014.12); *B33Y 30/00* (2014.12); *B33Y 40/20* (2020.01); *B33Y 50/02* (2014.12)

(56) References Cited

U.S. PATENT DOCUMENTS

| | | | | |
|---|---|---|---|---|
| 8,801,418 | B2* | 8/2014 | El-Siblani | B33Y 10/00 425/375 |
| 9,808,992 | B1* | 11/2017 | Linnell | B29C 64/245 |
| 11,097,467 | B2* | 8/2021 | Holt | B29C 64/232 |
| 2015/0165695 | A1* | 6/2015 | Chen | B29C 64/35 425/132 |
| 2019/0240924 | A1* | 8/2019 | Hendrik | B33Y 40/20 |
| 2020/0223142 | A1* | 7/2020 | Costabeber | B29C 35/0888 |
| 2020/0282639 | A1* | 9/2020 | Angelini | G03F 7/027 |
| 2020/0368973 | A1* | 11/2020 | Van Esbroeck | B33Y 40/20 |
| 2021/0283829 | A1* | 9/2021 | Marin-Martinod | B29C 64/241 |

* cited by examiner

METHOD AND DEVICE FOR DECENTRALIZED AUTOMATED ADDITIVE MANUFACTURING

TECHNICAL FIELD

This invention relates to a method for decentralization of automated additive manufacturing, while centralizing the pre-processing work, as well as a device capable of additive manufacturing with integrated and automated post-processing for facilitating the method.

BACKGROUND

It is common practice in the current state of the art, where additive manufacturing processes, including stereolithography (SLA) process (but not limited to), typically comprise of three phases (i.e. Design and Pre-processing, 3D printing and Post-processing), with each phrase requiring an immense amount of human involvement, effort and contribution.

Figure 1:
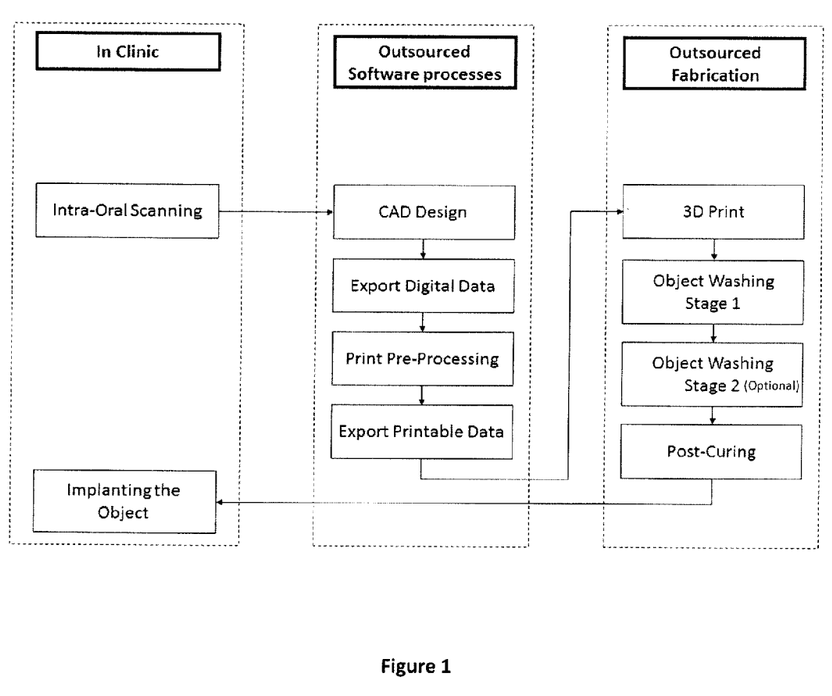
FIG. 1 shows a workflow pertaining to conventional digital dentistry.

The first phase Design and Pre-Processing involves both Computer Aided Design (CAD) and Computer Aided Manufacturing (CAM) steps, which are integral to digital file preparation. The first CAD step designs and optimizes digital 3D files for the additive manufacturing process. The second CAM step prepares the 3D model for printing on the specific 3D machine that is intended to be utilized, and includes painstaking and time-consuming procedures such as optimizing the 3D model orientation (XYZ placement and rotation), placement within a buildable volume of a specific machine, splitting or cropping models into multiple sections and generating sacrificial supporting structures to facilitate printing of the models. Digital file preparation is a critical and often laborious step of the entire process of 3D printing, and an increasing degree of know-how is required for the printing of highly complex 3D object(s). In some industries, for example in the dental field, complex 3D object(s) such as dental crowns, and bridges have to be printed in a certain specific way and how the digital file is prepared determines whether the 3D object(s) are successfully and accurately printed eventually. While 3D printing as a manufacturing process can provide improvement to the existing manufacturing process in these industries, file preparation is a necessary but non-value adding activity that users of 3D printing are required to carry out. Furthermore, pre-processing tasks typically require (a) expensive and complicated software programmes, and (b) skilled or experienced users with an engineering background or other required domain knowledge, typically well-versed in the process of the manufacturing method. For an example, in digital dentistry, a typical workflow to obtain a personalised dental object(s) has turnaround time stretching weeks rather than days, thereby delaying dental treatment for the patient, and requiring multiple consultations or visits. Conventional digital dentistry workflow consists of three phases, (a) in clinic scanning, (b) software-based processing of files, and (c) fabrication or manufacturing of the desired appliance (See FIG. 1). Typically, a clinician will begin by capturing 3D scan data of the patient's teeth, gingiva and occlusion, which is subsequently sent to an external laboratory or facility where the further processing takes place. The clinician may also choose to capture the patient's anatomy in a physical impression (for example using alginate), which may be physically delivered to an external laboratory to be 3D scanned. An impression may also be used to pour a stone or plaster model (a negative of the impression) which may also be 3D scanned, either in the clinic or in the external laboratory.

In the laboratory, the scan data (from an intra-oral scan or from a 3D scanned impression or model) will be processed into a virtual model of the patient's oral anatomy. Using this virtual model, a desirable part or appliance (e.g. dental crown) can be designed with a CAD software. Once the CAD process is complete, the virtual design of the desired part or appliance may be exported, typically in STL format or another format that captures 3D digital data. This data is subsequently imported in a print-preparation software, where the user can determine the desired position, orientation, optionally nesting with other objects within the available print space and optionally generating sacrificial supporting structures. The resulting print setup may then be exported in a printable format, which may take the form of machine code such as g-code, or cross-sectional images taken at varying height along the print setup (known as slice images, typically used in DLP, SLA or MSLA 3D printing processes). The CAD software and print-preparation software may sometimes be features of the same programme from a single supplier.

The exported printable data may then be loaded onto a 3D printer where the objects may be fabricated into physical objects out of a desired material which is typically a photopolymer. After 3D printing, the object is subjected to post-processing procedures, which are very time-consuming and non-value adding processes such as washing the 3D printed object(s) with solvent, exposure with additional light for final curing. After completion of the post-processing procedure, the 3D object may be physically sent from the external facility and delivered back to the clinic where it may eventually be implanted in or imparted on the patient's anatomy.

Figure 2:
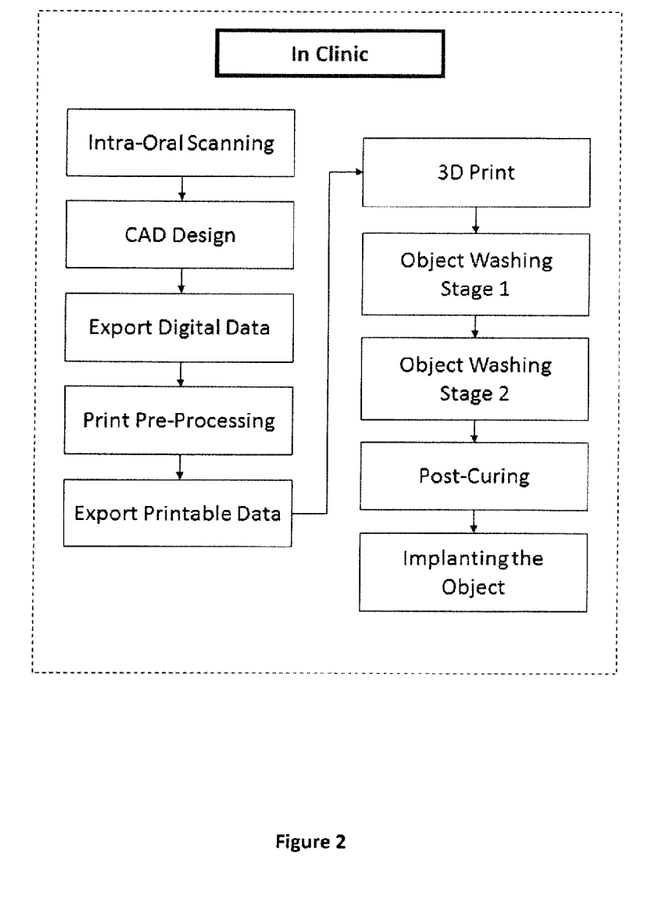
FIG. 2 shows a workflow pertaining to chairside printing.

In another current clinical practice, the clinician or his/her staff will conduct each of the required processes on-site in the clinic, which is commonly referred to as "chairside printing" (See FIG. 2). However, due to constraints of space and funds, the clinician will typically utilize compact machines for carrying out each of the fabrication steps. Generally, the machines used for this purpose are Formlabs, Asiga, Bego printers, and correspondingly small/cheap ultrasonic cleaning devices and light curing devices. Furthermore, since a multitude of procedures are involved in chairside printing, it is not an ideal workflow for most clinicians, as it requires an in-depth knowledge of CAD and printing software, operation of machines and handling of various chemicals that all extend beyond the scope of a typically desirable work in a clinical environment. However, with the benefit of turnaround time measurable in hours, and the same-day application to the patient in a single visit, there is a positive trend in the adoption of using compact 3D printing devices for this purpose.

SUMMARY OF INVENTION

In a first aspect, the invention provides a device comprising; a controller arranged to receive data for an article to print; a sub-device comprising a resin source arranged to provide material for printing the article; a radiation source arranged to direct radiation for the printing of said article; a plurality of stations, said stations including a printing tank in which the article is printed, at least one cleaning station for cleaning the printed article and a curing station arranged to at least partially complete the curing of the printed article; a build surface upon which the article is arranged to be printed; wherein controller is arranged to move the build surface and the plurality of stations relative to each other.

In a second aspect, the invention provides a method for printing an article using an additive manufacturing process, the method comprising the steps of:

a) collecting the 3D scan data of the article;
b) digitally transferring the 3D data to a centralised location;
c) preparing a digital file for controlling the printing of said article at said centralised location;
d) downloading the digital file from the centralised location to an additive manufacturing device, and consequently;
e) printing the article.

The present invention relates to a method where the file preparation step is removed from the clinicians' workflow and is instead carried out remotely. This is achieved by introducing a system where clinicians can remotely upload a file, for example an intraoral 3D scan data, and may further give specifications of the requirements and/or specifications of the end-product to be printed. In this workflow, the file is then processed remotely from the clinician in one or more centralised locations serving a multitude of similar clinicians. File processing includes, but not limited to, file preparation steps such as adding rafts or labels or additional features required, file fixing (broken or inverted triangle mesh, holes in scan data, and other generic defects at the data level), support generation (automatic or manual), parts arrangement and nesting, and slicing to printable file. At various stages in the software preparation phase, the clinicians are able to provide feedback on the (CAD) designed appliance, or on the state of the printable file after remote processing. There may be an iterative design and preparation process, involving one or more back and forth communications between the clinician and the centralized file preparation operator or artificial intelligence. The clinician may download the eventual printable output file or even choose to have it uploaded to a 3D printer directly via remote access and an internet connection.

The invention also relates to the automation of post-processing the 3D printed object(s) and this is achieved by combining, integrating and automating each of the printing, cleaning and post-curing steps, as well as any other steps that may be required for the fabrication of particular object(s) (i.e. post-processing activities) in the 3D printer itself. This workflow removes all human labour from the printing and post-processing steps and creating a seamless experience for the clinician, wherein the input (3D anatomy scan) and output (implantable object(s)) are identical to the conventional outsourced external laboratory workflow. The automated additive manufacturing device in the present invention will take care of all motions and processes required to generate a ready-to-use final object(s).

Henceforth, the entire work process from start to the final completion of the desired 3D object(s) or appliance(s) is fully automated, requiring none or very little of the clinician's time. In this way, clinicians from industries unrelated to 3D printing are able to focus on the activities that matter to their industries, thus enabling the clinician to achieve fast turnaround times associated with chairside printing, while retaining the ease-of-use associated with outsourcing work to an external facility and, without further requiring intensive training and in-depth knowledge of the actual technical processes that form part of the workflow. As from the clinician's perspective, the device in the present invention is not necessarily a 3D printer or additive manufacturing device, but rather a black box that merely "delivers" a customized or anatomically patient-specific object(s) directly into the clinic.

BRIEF DESCRIPTION OF THE DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

DETAILED DESCRIPTION OF EMBODIMENTS

Figure 3:
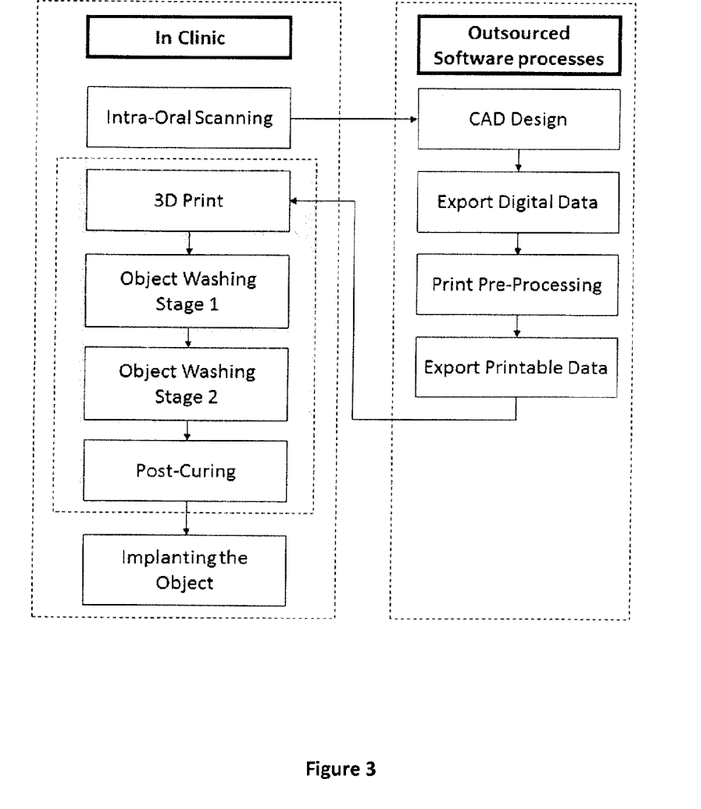
FIG. 3 shows a workflow according to the present invention.

Referring to FIG. 3, the invention comprises firstly capturing the patient's anatomy in the same way a clinician would normally do in the dental clinic, either by means of an intra-oral scanning or by creating a physical impression which may also be 3D scanned. Subsequently, the 3D data is sent out to an external facility, data/information support service, web portal, an area network (local or otherwise) or a cloud-based service, thus enabling actual work to be carried out from anywhere in the world. The work may also be partially, completely automated or completely non-automated (i.e. operated by humans at the back-end which may be centralized in one or more locations, or distributed decentralized as well), so that the outsourced software processes such as, but not limited to, file fixing, support generation (automatic or manual), parts arrangement, slicing to printable file, CAD design, exportation of digital data, pre-processing printing or exportation of printable data may be effectively and automatically conducted by a cloud-hosted artificial or machine intelligence, external facility, data/information support service, web portal or an area network (local or otherwise).

In an embodiment where 3D data is sent out by the users via a web portal as an interface or 3D data might be uploaded via a direct connection of a scanner (intraoral or otherwise) with the cloud service so that a user does not need to export a scanned file and then upload that to a portal via a web browser, another person in a possibly remote location receives the input file(s), processes it accordingly and duly return it to the users through the same web portal. It is preferable that the file is transferred directly to a connected 3D printer, as opposed to having the users downloading it. In an alternative embodiment, the users may access a web portal through which another human being and/or an artificial intelligence will process the file. Performing such tasks or processes may be carried out in the form of an artificial/machine intelligence carrying some or all of the abovementioned tasks automatically, or a combination of both human effort and artificial/machine intelligence, with the extent of the latter depends on the maturity of the artificial intelligence.

By automating the design and preprocessing steps (i.e. the above processes), the fast turnaround time to delivery of printable data is achieved based on the input using 3D scan data of the patients' anatomy. There may be one or multiple intermediate stages where the clinician is required or requested to provide further feedback in the form of comments, decisions or approvals for the proposed CAD design or treatment plans generated by the external outsourced software process service. After the export or delivery of printable data to the clinician, he/she may proceed or initiate with the 3D printing of the 3D object using an automated additive manufacturing device to streamline the process of a seamless and automated digital dentistry. The exported printable data from the cloud-based service, external facility, data/information support service, web portal or an area network (local or otherwise) may alternatively be uploaded directly onto an automated additive manufacturing device via an internet connection, wireless communications or remote access, ensuring that entire workflow is seamless, hands-off and automated. The uploading process can be done by the same person or artificial intelligence.

Figure 4:
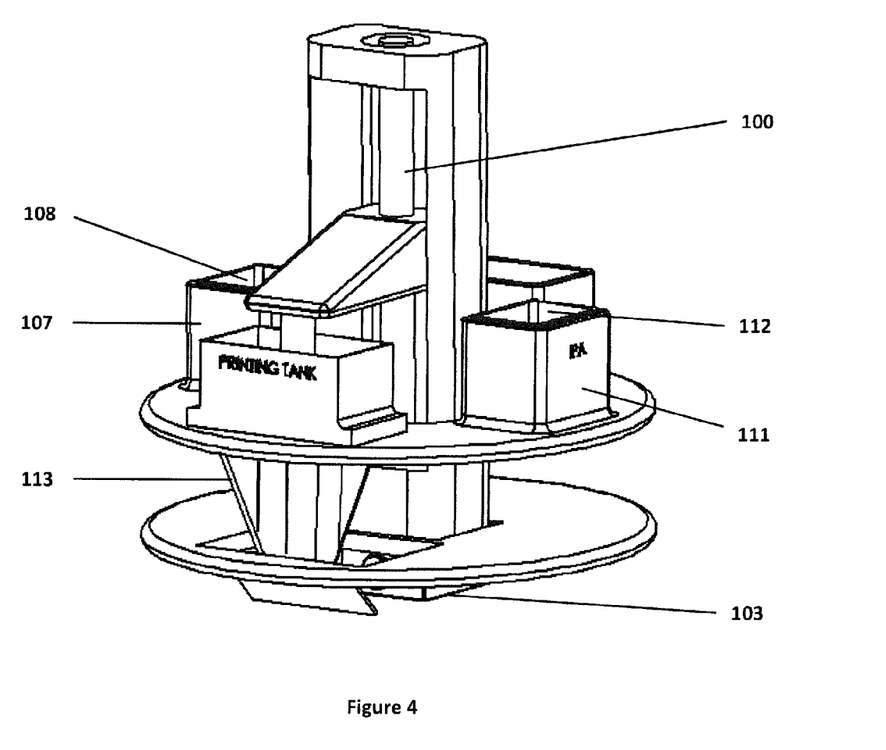
FIG. 4 is a schematic view of a carousel system of an automated additive manufacturing device.
Figure 5:
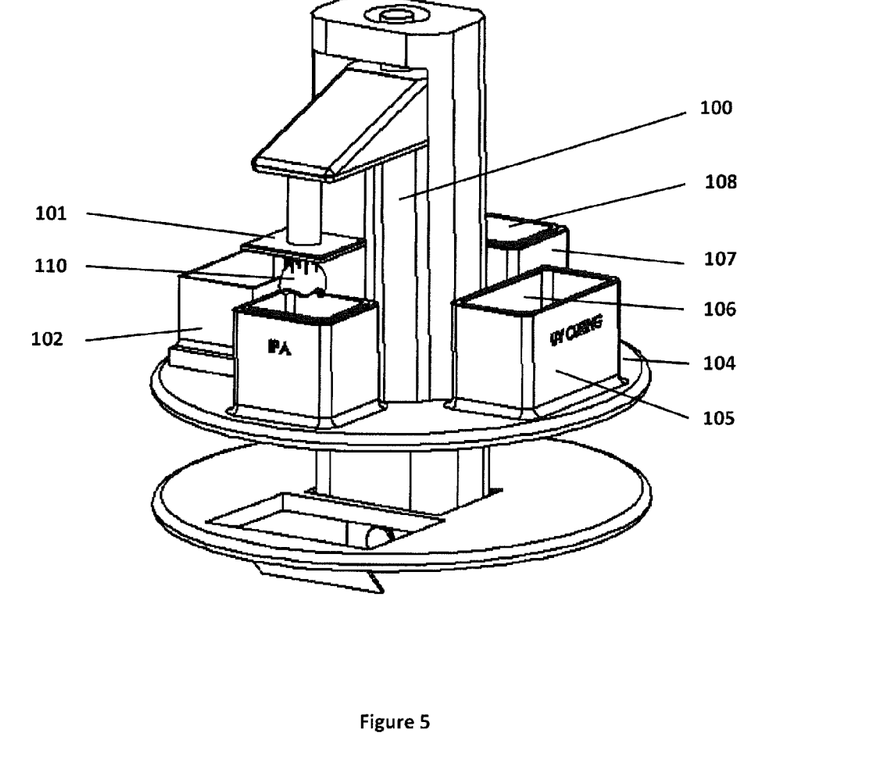
FIG. 5 is a schematic view of a carousel system of an automated additive manufacturing device with the printed object(s) being transferred from the printing resin tank into a cleaning, washing or collecting vessel as the movable tray rotates.

In one embodiment of the invention, an automated additive manufacturing device comprises a vertical linear motion device 100 capable of moving an attached build surface 101 along the z-axis in an upward and downward vertical linear motion as shown in FIGS. 4 and 5. The vertical linear motion device may comprise a linear motor, ball screw, lead screw or belt and pulley system with stepper motor or servo motor, or any other linear actuator such as hydraulic, pneumatic or the like, or a combination thereof, or any other means capable of moving the build surface with sufficient accuracy and speed along the z-axis. The build surface 101 faces each of the vessels or devices and may comprise a platform plate having a surface upon which 3D printed object(s) 110 can adhere and moves vertically as the 3D object(s) is being printed layer by layer and subsequently being transferred from a series of vessels and devices to undergo a process of washing, curing or post-curing and collection of the 3D printed object(s). Various technologies and methods of 3D printing or additive manufacturing made widely available and known to the skilled person may be used in the automated additive manufacturing device. Additive manufacturing devices such as those disclosed in WO 2015/072921 and WO2016/122408 or SLA or DLP may be used. The platform plate may be made of, for example, steel, aluminium, glass, or any other materials which 3D printable polymers can adhere and/or may also comprise of one material and another material coating on the surface where printing will take place. The platform plate may be partially separable or fully separable from the printer bed and may further comprise a magnetic release mechanism or the use of other release mechanisms. The use of the magnetic release mechanism such as electro-magnetic mechanism or the like, or other variations of release mechanisms enables the build surface to pick or adhere, change and release different platform plates in a seamless process. In an example, during the start of a print cycle, the build surface picks or selects a clean platform plate from the vessel or device containing a stack of clean platform plates and releases each platform plate into the collection vessel or device after every cycle of print, wash, curing or post-curing.

Figure 6:
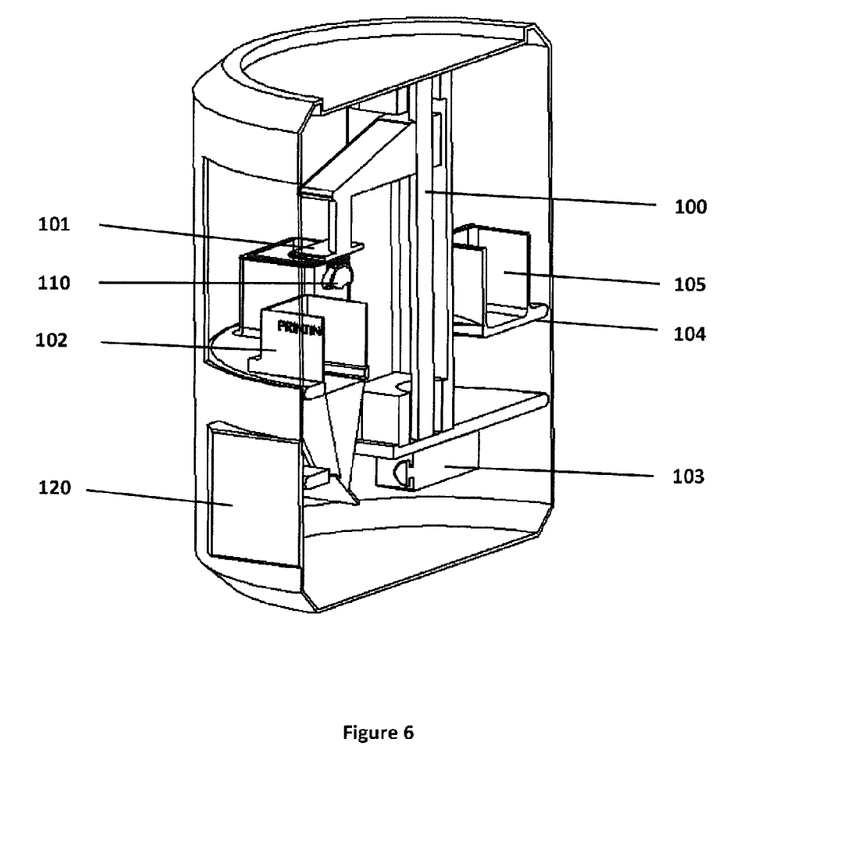
FIG. 6 is a schematic cross-sectional view of a carousel system of an automated additive manufacturing device.

The device 100 also comprises a resin vessel, such as a printing tank 102, for the containment or holding of 3D printing article(s) 110 made of materials such as photopolymer material and produced by the irradiation of a photopolymer contained within resin vessel 102 or its internal vessel, with light of the appropriate wavelength from illumination source 103. The resin vessel 102 may have a substantially translucent or transparent lower wall surface that permits illumination to pass through it from below which subsequently targets the photopolymer resin. Preferably, the resin vessel 102 comprises of an external vessel 122 and an internal vessel 121 to facilitate the quick and easy exchange of materials. The external vessel may be rigid and permanent, made of steel, aluminium or engineering plastics whereas the internal vessel may be a disposable container made of low-cost plastic material that does not react with the photopolymer. The internal vessel 121 may also have a coating or film on its lower bottom internal surface to facilitate layer release while printing. The external vessel 122 may lack a bottom wall surface, such that the bottom surface of the internal vessel is the only boundary between the photopolymer material and the illumination source 103 below. The internal vessel 121 may be provided as a pre-sealed container or capsule with a seal that is removable by peeling, cutting or other means of destruction, or a removable lid or cover. The internal vessel may be provided as a pre-filled contained or capsule containing an appropriate quantity of the required photopolymer for a particular application. In such an embodiment, the substantially translucent bottom surface may also be covered with an external removable lid or cover, or a seal that is removable by peeling or cutting, so as to prevent ambient or other sources of illumination from prematurely polymerizing the contained photopolymer through the translucent bottom surface. The illumination device 103 (as shown in FIG. 6) comprises a laser diode with accompanying optics, but it can also be a DLP projector system, or a source of light or a multitude thereof, emitting light of a wavelength capable of polymerizing the photopolymer material. 113 is the light path being shown when the light source 103 is functioning, projecting an image or other illumination onto the polymer material in the resin vessel. The illumination device 103 may be equipped to selectively direct or expose regions of the build area, or regions of the bottom surface of the resin vessel 102. As shown in FIG. 6, the automated additive manufacturing device may be contained in a cubicle, enclosure or compartment to minimize contamination or interferences in the printing or processing of the 3D object(s) from external factors. Furthermore, the external body of the device should ideally be air-sealed and may contain air filtration systems to ensure that no odours or vapours from the resin and/or solvents are exchanged with the ambient air, so as to facilitate clean and safe operation in a clinical environment.

The device 100 further comprises a movable tray 104, preferably movable in a rotary direction or otherwise movable to a set of desired positions, upon which multiple stations, may be permanently or non-permanently mounted on and may be rotated against an (imaginary) axis located in the vertical linear motion device 100, thereby directed towards the path of the vertically moving build surface 101. Said stations may comprise vessels and/or devices for the relevant aforementioned functions. Alternatively, the vertical stage may be mounted outside the rotary circle, e.g. in a corner, and a square-shaped external body may be built around the printer. For this arrangement, the stage need not be at the center of the machine, and so the axis of rotation need not coincide with it. The movable tray may be rigid and have sufficient stiffness and flatness to facilitate the alignment of the build plate surface and the resin vessel internal bottom printing surface. As shown mounted on the movable tray in FIGS. 4 and 5, the stations include a resin vessel 102, two cleaning vessels 107 and 111, and a UV curing device 105, but there may be more or fewer vessels or devices provided. In this embodiment, the multitude of stations, including vessels or devices, may be fixed in space whereas the vertical linear motion device 100 and build surface 101 are mounted upon movable tray 104 such that it may be moved (preferably in a rotary direction) to a desired position relative to each of the vessels or devices. In an exemplary example, movable tray 104 has been rotated by a difference of 90 degrees as shown in FIGS. 4 and 5, and resulting in the build surface 101 being effectively transferred from moving into or out of the resin vessel 102 after the printing process, to moving into or out of the cleaning vessel 111 for washing. Washing typically takes place in a solvent such as isopropyl alcohol, or the like and a second washing stage with the same, or another solvent, or with water may also be conducted. The movement of the movable tray may be dependent upon the various sequences of washing or curing steps and procedures required for the processing and preparation of the 3D printed object(s).

Figure 7A:
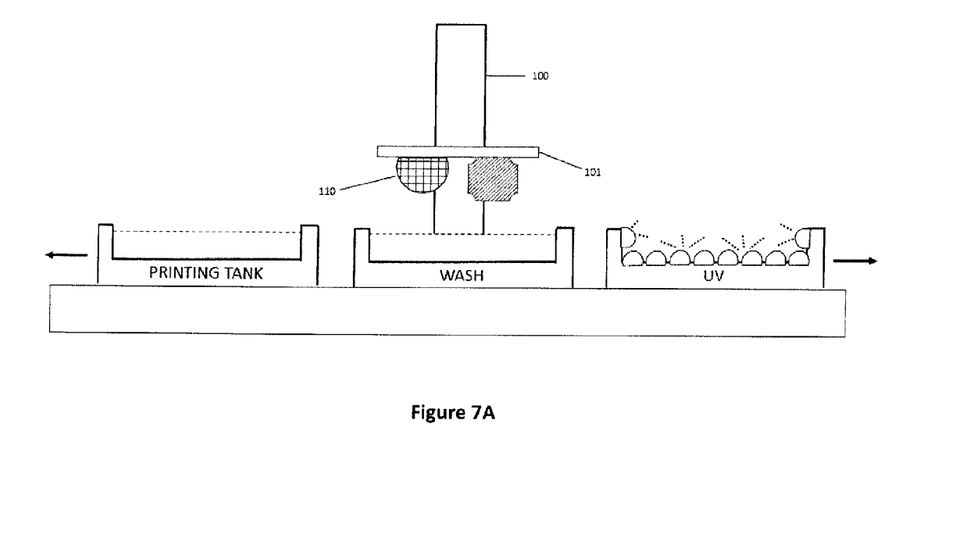
FIG. 7A is a schematic view of a linear system of an automated additive manufacturing device where the movable tray moves in a linear direction and facilitating the linear motion device with attached printed object(s) on the build surface.
Figure 7B:
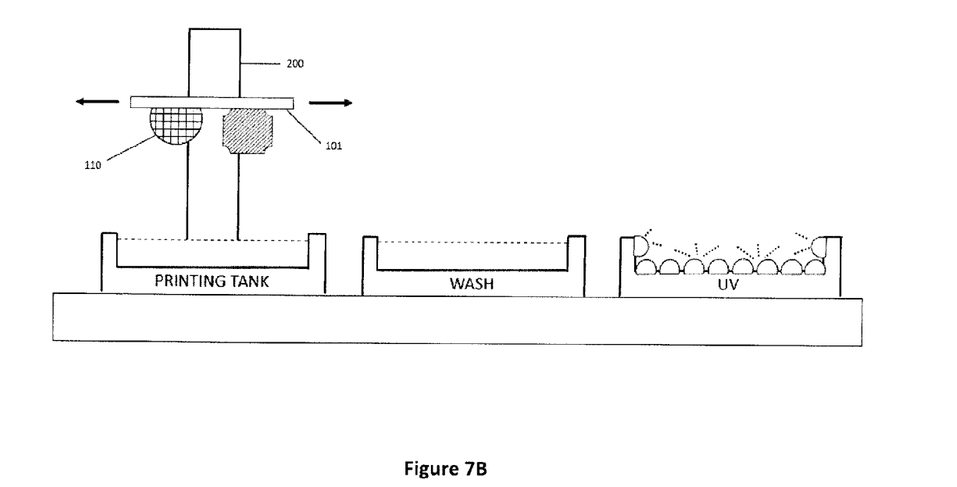
FIG. 7B is a schematic view of a linear system of an automated additive manufacturing device where a vertical and horizontal linear motion device with attached printed parts(s) on the build surface, moves in a bi-directional linear way.

In another embodiment, the movable tray 104 may be arranged in a linear manner as opposed to the rotary direction as described above. In this linear arrangement and referring to FIG. 7A, movable tray 104 moves in a linear manner and may be bi-directional, therefore facilitating the transfer of the multiple vessels or devices towards the vertical linear motion device 100 (z-axis). In an alternative embodiment, the linear movable tray remains stationary and the linear motion device 100 is replaced with a vertical and horizontal linear motion device 200 that moves in an axis perpendicular to the axis which the build surface 101 moves (FIG. 7B). The vertical and horizontal linear motion device 200 moves in a bi-directional horizontal manner, concurrently transferring the attached build surface 101 along the different segments of the linear tray and thereby undergoing the various sequences of washing or curing steps and procedures required for the processing and preparation of the 3D printed object(s). In other embodiments, the automated additive manufacturing device may comprise of both a movable tray and a vertical and horizontal linear motion device to expedite the printing and various sequences of washing or curing steps and procedures required for the 3D printed object(s). In the embodiment where the movable tray 104 moves in the presence of the vertical linear motion device 100 (z-axis) is viewed as being more advantageous since this facilitates the easy alignment of the vertical linear motion device if it moves just in one axis.

Figure 8A:
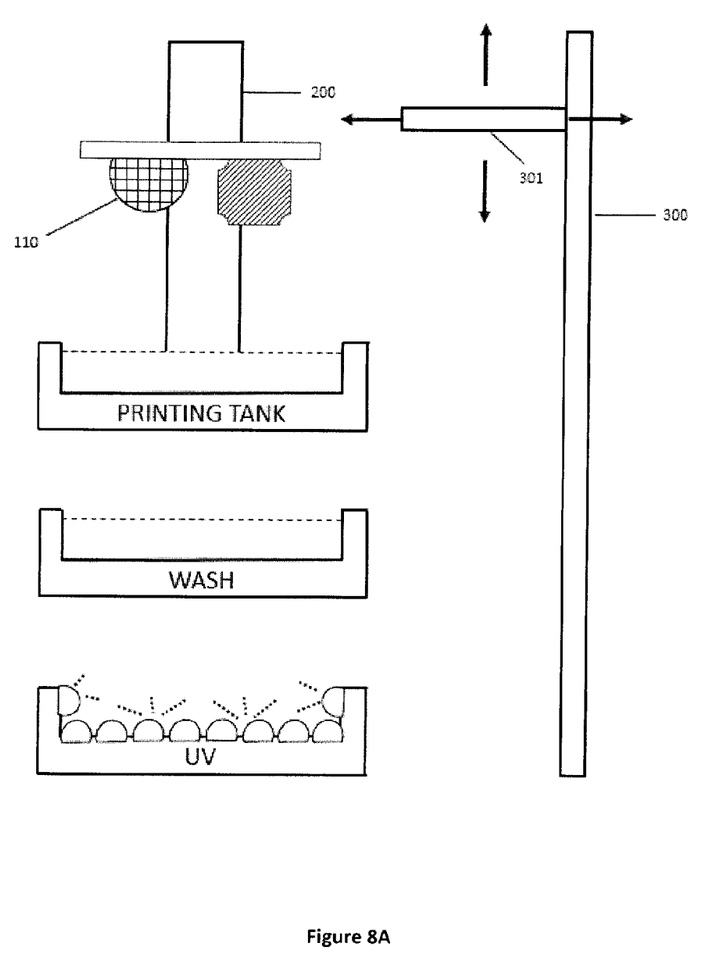
FIG. 8A is a schematic view of a separate linear actuator of an automated additive manufacturing device that comprises an arm capable of retrieving the platform plate(s) or build platform from the z-axis actuator in the printing area.
Figure 8B:
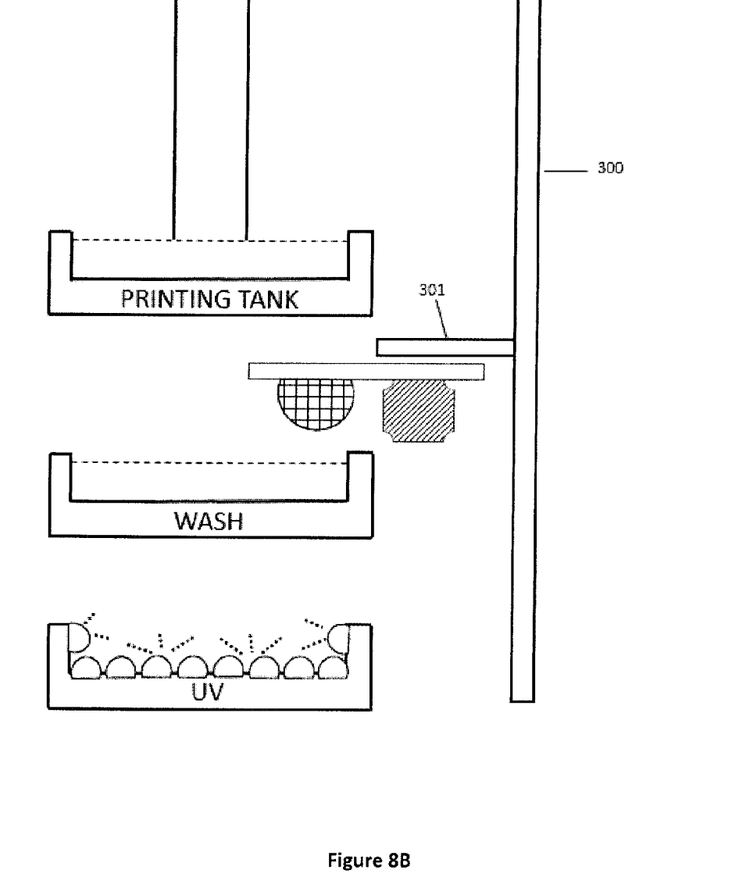
FIG. 8B illustrates that the arm of the separate linear actuator may be capable of extending, retracting or move in a x-y direction to reach to the build platform or platform plate(s) from the printing area so as to avoid colliding or crashing against any of the interior subsystem components.

In another embodiment, the printing, washing, curing and post-curing vessels may be arranged in a vertical, linear manner. In this present embodiment, a separate linear actuator 300 moves vertically in a z-direction (as shown in FIGS. 8A and 8B) and may be in the form of a linear motor, ball screw, lead screw, or belt and pulley system with stepper or servo motor or any other linear actuator such as hydraulic or pneumatic or the like, or a combination thereof, or any other means capable of moving the build surface or platform plate(s) with sufficient accuracy and speed along the z-axis. The separate linear actuator comprises an arm 301 that is capable of retrieving the platform plate(s) or build platform from the z-axis actuator in the printing area. The arm 301 may be capable of extending, retracting or move in a x-y direction to reach to the build platform or platform plate(s) from the printing area so as to avoid colliding or crashing against any of the interior subsystem components. The platform plate(s) or build surface may be secured and released quickly with electromagnetic means, any other means capable of achieving such an effect, or as disclosed in prior inventor's patent filings. The build surface may comprise of one or more platform plates. Subsequently, the arm will move vertically to the next vessel(s), which may be the washing vessel(s), curing and/or post curing vessel (as shown in FIG. 8B). After the whole process of printing, washing and post curing is completed, the arm will then move to the dispense area where the finished build platform or platform plate(s) containing the printed part may be ejected and/or collected. The advantages of such embodiment, among other things, are to achieve a compact footprint, which at times can be a precious commodity in a dental practitioner's office and providing a stationary printing station which helps with the stability and repeatability of the machine due to fixed alignment.

The UV curing device 105 comprises a container having at least one or preferably a plurality of light emitters which may be diodes or other types of bulbs, emitting a wavelength capable of polymerizing the photopolymer material being printed. The device 105 may also comprise emitters of heat or infrared radiation so as to increase the temperature of items placed in the device, particularly after the processing of washing. The UV curing device may have a substantially translucent or transparent lower surface that permits illumination to pass through it from below which subsequently targets the items contained in the device. The device 105 may further consist of an external vessel and an internal vessel 106 to facilitate quick and easy cleaning of the internal walls. The external vessel may lack a bottom surface, such that the bottom surface of the internal vessel is the only boundary between the photopolymer and an illumination source below.

Each of the cleaning vessels 107 and 111 comprises a vessel for the containment of alcohol or other cleaning solutions. The vessels may consist of an external vessel and an internal vessel 108 or 112 to facilitate quick and easy exchange of alcohol or other cleaning solutions. The cleaning vessel may or may not be equipped with sonicating devices or other means of aggravating the cleaning solution to ensure a more thorough and quicker cleaning of any items placed within the cleaning vessel or its internal vessel. The internal vessel 108 or 112 may be provided as a pre-sealed container with a seal that is removable by peeling, cutting or other means of destruction. The internal vessel may be provided as a pre-filled contained or capsule containing an appropriate quantity of the required photopolymer for a particular application. In addition, during a printing process, the users may interact with the interface of the automatic additive manufacturing device via an external display 120, which may be either a LCD or OLED type of display and may feature touch-screen control. The external display comprises of an operating system that aids in the uploading of printable data from the outsourced software processes and may update the users on the progress of the printing and processing of the printed object(s). Users may also set instructions in the operation system of the automated additive manufacturing machine via the external display. There may also be a system of internal electronics and an operating system that regulates both this external display (UI) as well as the actual internal moving parts and illumination or projection system.

Figure 9:
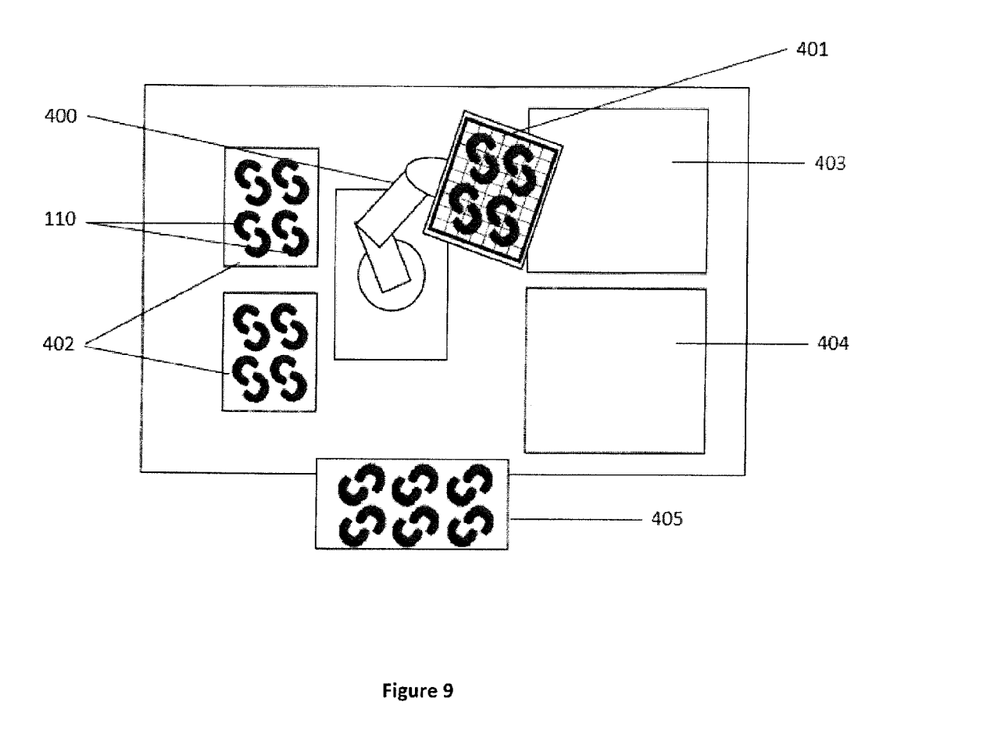
FIG. 9 is a schematic view of an automated additive manufacturing device with a robotic arm mechanism.

Referring now to FIG. 9, the automated additive manufacturing device may comprise of an articulated arm, said articulated arm 400, which may include 6 degrees of freedom to an end effector located at the end of said arm. Said end effector may be a build surface for which the articulated arm provides several degrees of freedom. For instance, the articulated arm may provide movement of said build surface having up to 6 degrees of freedom, including translation along 3 principal axes, and rotation about said 3 principal axes. Thus, in one embodiment, the articulated arm may be a 6-axis robotic arm with novel quick release mechanism or the like that transfers removable build surface or platform plate(s) 401 to the different sections arranged around the robotic arm. Each of these sections may comprise of areas for carrying out VAT/tank 402, washing area 403, post curing 404 and/or retrieval 405, or other 3D processing procedures required for the making of the printed 3D object(s). The arm can be a robotic arm with multiple axis which allows total freedom in the placement or arrangement of the different sections, including more degrees of motion to facilitate layer release in the 3D printing process, such as for example a rotary motion component to allow for a peeling action to more gradually remove a printed layer off the print surface on the internal bottom wall of the resin vessel.

After the completion of the process of washing and curing or post-curing of the 3D printed object(s) in the automated additive manufacturing device, the customized patient-specific 3D object(s) is ready for use or implantation as part of the treatment procedure for the patient.

Although particular embodiments have been described and illustrated herein, it will be appreciated by those of ordinary skill in the art that various modifications and combinations of features of the above embodiments are possible without departing from the spirit or essential characteristics thereof. For example, the present invention may be applicable to other fields and not limited to dental or oral health applications and therefore the term "3D object(s) or 3D printed object(s)" may also encompass any 3D part(s) or appliance(s) that result from the applications in the different fields. In addition, the term clinician is not only limiting to medical clinicians but also comprises anyone who works in a clinician setting, laboratory technologist, clinician technologist, nurse or users of the automated additive manufacturing device and/or workflow. The foregoing embodiments, therefore, are to be considered in all respects illustrative rather than limiting the invention described herein and the scope of the invention is indicated by the appended claims.

We claim:

1. An additive manufacturing device comprising;
   a controller configured to receive data for an article to print;
   a sub-device comprising a resin source configured to provide material for printing the article;
   a radiation source arranged to direct radiation for the printing of the article;
   a plurality of stations that comprise a printing tank in which the article is printed, at least one cleaning station for cleaning the printed article, and a curing station configured to cure the printed article at least partially; and
   a build surface comprising a removable platform plate upon which the article is configured to be printed,
   wherein controller is configured to move the build surface relative to the plurality of stations,
   wherein the plurality of stations are fixed spatially in a vertical orientation relative to each other,
   wherein the device further comprises a vertically oriented linear slide that is capable of moving the platform plate vertically, along a z-axis, on the vertically oriented linear slide to deliver the article sequentially to the plurality of stations, and
   wherein the device further comprises an arm associated with the vertically oriented linear slide, the arm being capable of movement in a x-y direction to move the platform plate from one station to another station of the plurality of stations.

2. The device of claim 1, wherein the arm is configured to extend and retract with respect to the vertically oriented linear slide.

3. The device of claim 2, wherein the arm is configured to secure the platform plate by electromagnetic means.

4. The device of claim 1, wherein the curing station is a first curing station, wherein the at least one cleaning station comprises a first cleaning station, and wherein the plurality of stations further comprises any one or a combination of: a second curing station for post-curing the printed article, a second cleaning station, and an unloading station for unloading the printed article.

5. The device of claim 1, wherein the build surface is configured to attach to the platform plate at the start of a print cycle for printing the article.

6. The device of claim 1, wherein the build surface is configured to release the platform plate at the end of a print, wash, cure, or post-curing cycle for the printed article.

7. The device of claim 1, wherein the printing tank comprises a resin vessel with a translucent or transparent bottom wall surface.

8. The device of claim 1, wherein the printing tank comprises a resin vessel, the resin vessel comprising an external resin vessel, and wherein the printing tank further comprises an internal resin vessel within the external resin vessel.

9. The device of claim 8, wherein the internal resin vessel is selectively removable from the external resin vessel, and wherein the internal resin vessel is configured to contain the material for printing the article and comprises a coating on an internal surface of a bottom wall of the internal resin vessel.

10. The device of claim 8, wherein the internal vessel is provided as a capsule that comprises a particular quantity of the material.

11. The device of claim 1, wherein the at least one cleaning station comprises an internal cleaning vessel that is selectively removable from the at least one cleaning station, and wherein the internal cleaning vessel is configured to contain a cleaning solution for cleaning the printed article.

12. The device of claim 1, further comprising:
an electromagnetic release mechanism, wherein the electromagnetic release mechanism enables the build surface to release the platform plate at the end of a print, wash, or cure cycle for the printed article.

13. The device of claim 1, wherein the curing station comprises an ultraviolet (UV) curing device.

14. The device of claim 13, wherein the UV curing device comprises a container having at least one light emitter capable of polymerizing the material for printing the article.

15. The device of claim 1, further comprising: an external display that features touch-screen control.

16. The device of claim 15, wherein the external display comprises an operating system for uploading printable data for the printed article from software processes.

17. The device of claim 15, wherein the external display is configured to update users on progress of printing of the article.

* * * * *